United States Patent
Tse et al.

(10) Patent No.: US 9,721,112 B2
(45) Date of Patent: Aug. 1, 2017

(54) PASSIVE COMPLIANCE VIOLATION NOTIFICATIONS

(71) Applicant: AirWatch LLC, Atlanta, GA (US)

(72) Inventors: Kar Fai Tse, Peachtree Corners, GA (US); Erich Peter Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 191 days.

(21) Appl. No.: 14/500,031

(22) Filed: Sep. 29, 2014

(65) Prior Publication Data

US 2016/0092685 A1 Mar. 31, 2016

(51) Int. Cl.
*G06F 21/62* (2013.01)

(52) U.S. Cl.
CPC .. *G06F 21/6218* (2013.01); *G06F 2221/2111* (2013.01); *G06F 2221/2149* (2013.01)

(58) Field of Classification Search
CPC .............................. G06F 21/57; G06F 21/6218
USPC ............................................................. 726/1
See application file for complete search history.

(56) References Cited

U.S. PATENT DOCUMENTS

| | | | |
|---|---|---|---|
| 2010/0148947 A1* | 6/2010 | Morgan | B60R 25/04 340/426.22 |
| 2013/0045753 A1* | 2/2013 | Obermeyer | G08B 21/0277 455/456.1 |

FOREIGN PATENT DOCUMENTS

WO    WO 2007075850 A2 *  7/2007  ........... G06F 21/577

\* cited by examiner

*Primary Examiner* — Hadi Armouche
*Assistant Examiner* — Angela Holmes

(57) ABSTRACT

Disclosed are various embodiments for passive compliance violation notifications. In one embodiment, it is detected that that a policy violation with respect to use of a client device has occurred. It is then determined that the policy violation may be passive. A user notification of the policy violation is generated by the client device in response to determining that the policy violation may be passive. The frequency and/or intensity of this notification may depend upon an extent of the policy violation. If the policy violation is later determined to be active, additional actions may be performed, such as disabling access to or removing managed resources on the client device.

22 Claims, 6 Drawing Sheets

PASSIVE COMPLIANCE VIOLATION NOTIFICATIONS

BACKGROUND

For purposes of productivity, enterprises may provide employees access to enterprise data via mobile devices, such as smartphones, laptops, tablets, and so on. For security reasons, the mobile device management systems may place various restrictions on applications and data accessed via the mobile devices. However, information technology departments continue to be challenged in ensuring that restricted actions are not performed via unauthorized applications on client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to passive compliance violation notifications. Enterprises and other organizations may establish various compliance rules that govern the use of client devices by employees and other associates. The compliance rules may dictate how features of the client device may be used (e.g., video recording, audio recording, etc.), how managed applications of the client device may be used (e.g., enterprise email, enterprise social networking, etc.), how managed data of the client device may be used, and so on. The compliance rules may establish geographic boundaries, time-based restrictions, and/or other restrictions.

Many violations of the established compliance rules may be passive. As a non-limiting example, an employee may be walking with a secured client device in a company facility. Suppose that use of the secured client device is limited to a designated room according to a geofence. A geofence may encompass a specific area where use of a managed resource is allowed, where use of the managed resource is not allowed outside of the specific area. Alternatively, a geofence may encompass a specific area where use of a managed resource is not allowed, where use of the managed resource is allowed outside of the specific area. The employee may be paying attention elsewhere and inadvertently walk out of the designated room with the secured client device. The resolution for a violation of the compliance rule may be to wipe the managed data from the secured client device. However, assuming that the violation was unintentional, the employee may have wanted to avoid such a harsh result. Other use cases beyond the employer/employee scenario may include parents wishing to limit use of a computing device by a child, teachers wishing to limit use of computing devices by students in a classroom, and so on.

Various embodiments of the present disclosure provide notifications in response to one or more types of violations of compliance rules. The violations may be of a passive nature. That is, the user may not be actively or intentionally violating the compliance rule. Accordingly, a notification may be provided in order to confirm whether the violation is passive or active in nature. If the violation is indeed passive, unnecessary harsh results (e.g., device wipes, enterprise wipes, etc.) may be avoided. By contrast, some actions (e.g., downloading a blacklisted application from an application distribution service) may be clearly intentional, and the remedial action for such a policy violation may be preserved without an advance notification.

Figure 1A:
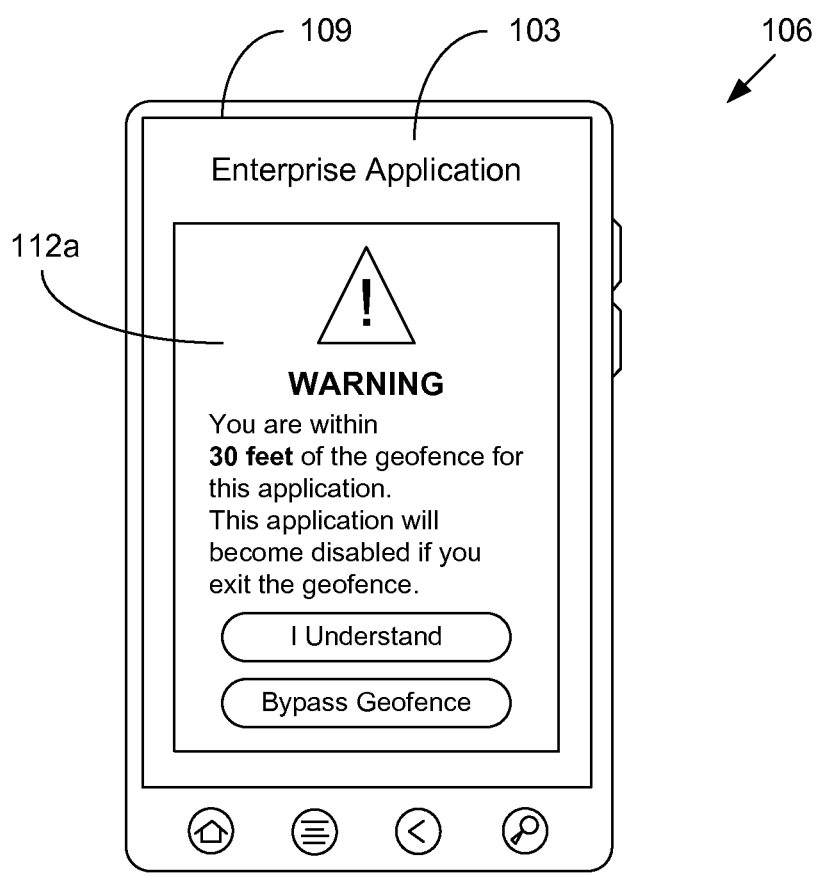
FIGS. 1A and 1B are pictorial diagrams of example user interfaces rendered by a client device upon a display according to various embodiments of the present disclosure.

With reference to FIG. 1A, shown is a pictorial diagram of an example user interface 103 rendered by a client device 106 upon a display 109. The client device 106 may, for example, correspond to a smartphone, tablet, electronic book reader, or other computing device. The user interface 103 may correspond to a managed application executed in the client device 106. The user interface 103 here is titled "Enterprise Application." The managed application may correspond to enterprise email, enterprise social networking, enterprise productivity, and/or any other type of functionality. The managed application may be managed in the sense that it is configured to enforce various compliance rules, which may include restrictions based at least in part on geofences, time of use, and/or other restrictions. The managed application may also employ single-sign-on enterprise security credentials.

In this example, a dialog 112a is rendered upon the user interface 103. The dialog 112a informs the user that the user is about to violate a compliance rule, perhaps intentionally or unintentionally. Here, in this non-limiting example, the dialog 112a informs the user that he or she is within thirty feet of a geofence for the given managed application. The dialog 112a also informs the user that the consequence of violating the compliance rule (i.e., leaving the geofence) will be that the managed application will become disabled. Selection components (e.g., buttons) are provided in the dialog 112a that enable the user to select from "I Understand" or "Bypass Geofence."

If the user selects "I Understand," the management system is consequently able to confirm the intentionality of the violation. If the user selects "I Understand" yet violates the geofence restriction, the management system may then disable the management application, with the disabling being an informed consequence of the violation. If the user fails to make a selection, the user may be violating the restriction intentionally or unintentionally; however, due warning was provided to the user before the consequence is imposed.

Figure 1B:
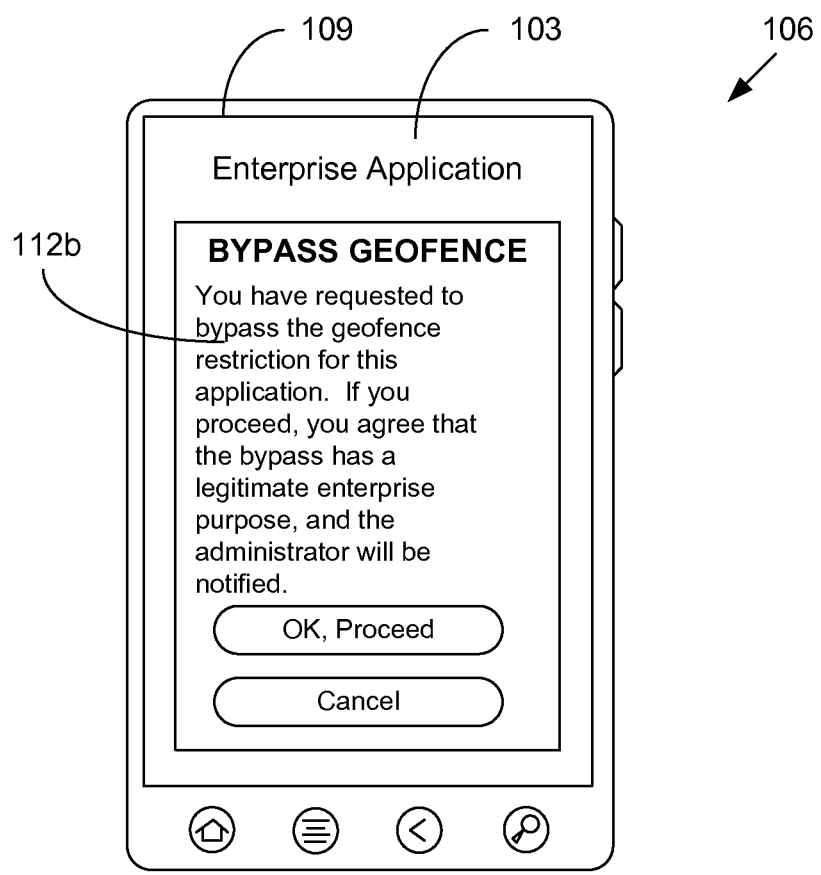

Moving on to FIG. 1B, shown is a pictorial diagram of another example user interface 103 rendered by a client device 106 upon a display 109. This example corresponds to a user interface 103 rendered by the managed application if a user were to select "Bypass Geofence" in dialog 112a (FIG. 1A). In this example, it is understood that violation of the compliance rule is willful, but the user would like to avoid the usual consequence.

The dialog 112b informs the user of the consequences of the bypass. Here, the user represents that the bypass has a "legitimate business purpose," and moreover, the user understands that an "administrator will be notified." The user is given a choice of proceeding with the bypass or canceling. Although a bypass option is discussed herein, no bypass may be provided in some embodiments, and in some cases, a bypass option may be limited only to qualified users and/or in limited, predefined circumstances.

In the following discussion, a general description of the system and its components is provided, followed by a discussion of the operation of the same.

Figure 2:
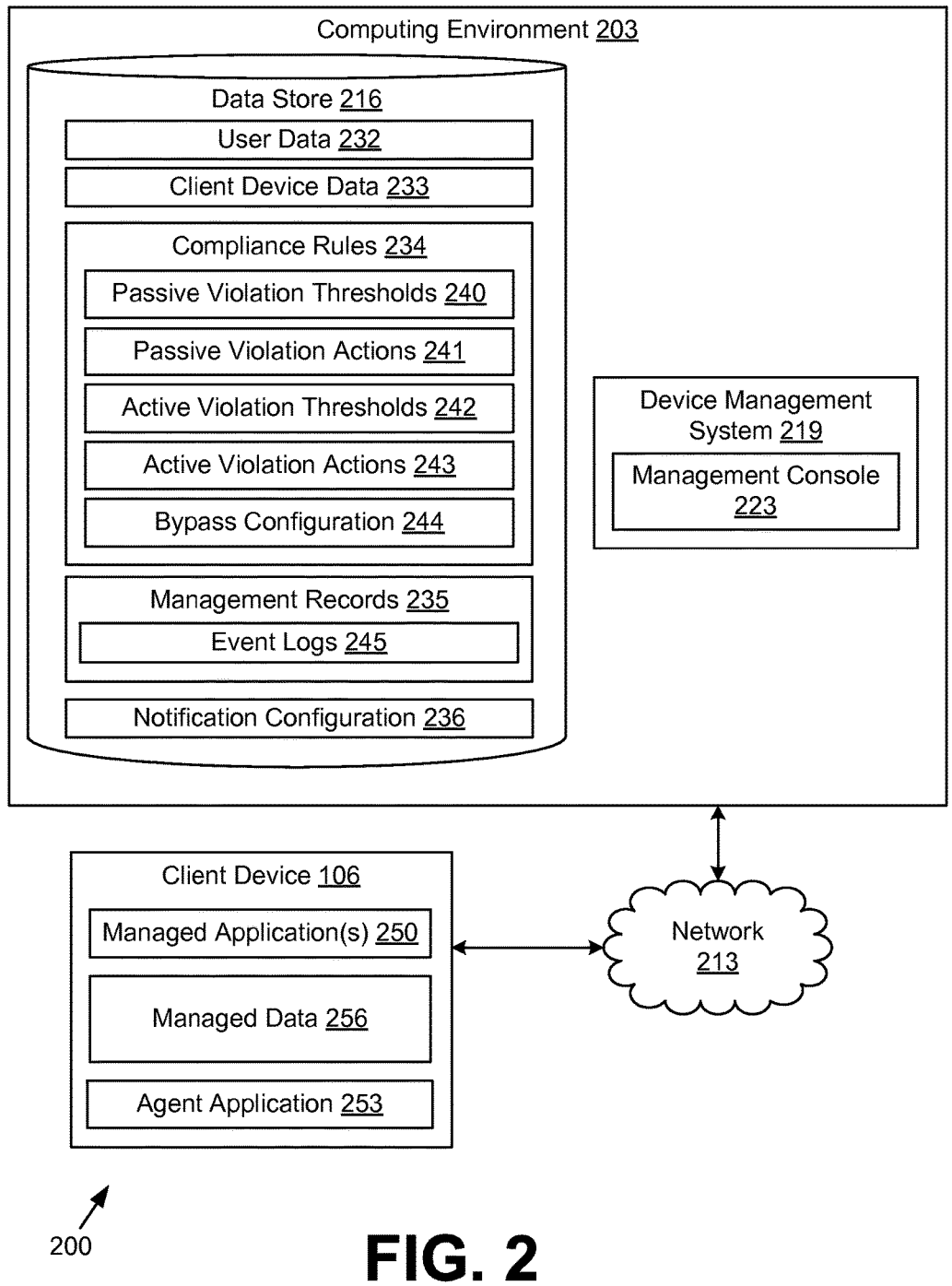
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device 106, which are in data communication with each other via a network 213. The network 213 includes, for example, the Internet, one or more intranets, extranets, wide area networks (WANs), local area networks (LANs), wired networks, wireless networks, other suitable networks, or any combination of two or more such networks. For example, such networks 213 may comprise satellite networks, cable networks, Ethernet networks, telephony networks, and other types of networks.

The computing environment 203 may comprise, for example, a server computer or any other system providing computing capability. Alternatively, the computing environment 203 may employ multiple computing devices that may be arranged, for example, in one or more server banks, computer banks, or other arrangements. Such computing devices may be located in a single installation or may be distributed among many different geographical locations. For example, the computing environment 203 may include multiple computing devices that together form a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time. The computing environment 203 may also include or correspond to one or more virtualized server instances that are created in order to execute the functionality that is described herein.

Various systems and/or other functionality may be executed in the computing environment 203 according to various embodiments. Also, various data is stored in a data store 216 that forms part of computing environment 203 as illustrated. It is also possible for the data store 216 to be remote from the device management system 219 and accessible via the network 213 or another network (not shown). The data store 216 may be representative of a plurality of data stores 216. The data stored in the data store 216, for example, is associated with the operation of the various systems and/or functional entities described below.

A device management system 219 (and other systems, not shown) may be executed in the computing environment 203. The device management system 219 may be executed to manage and/or oversee the operation of multiple client devices 106. For example, an employer may operate the device management system 219 to ensure that the client devices 106 of its employees are operating in compliance with various compliance rules. By ensuring that the client devices 106 of its employees are operated in compliance with the compliance rules, the employer may control and protect access to various data. The device management system 219 may also facilitate access to email, calendar data, contact information, documents, or other enterprise data to which an enterprise may wish to provide access by users via client devices 106.

In one embodiment, the device management system 219 may provide a management console 223 and/or other components. The management console 223 may facilitate an administrator's operating and control of the device management system 219. For example, the management console 223 may generate one or more user interfaces that are rendered on a display 109 (FIGS. 1A & 1B) or accessible via a browser executed by another computing device. Such user interfaces may facilitate entering commands or other information to facilitate configuration of the device management system 219. Additionally, the user interfaces may render presentations of statistics or other information regarding the client devices 106 that are managed by the device management system 219.

The computing environment 203 may also execute other applications to facilitate interactions with a client device 106, such as an application distribution service that distributes applications and/or updates for applications to the client device 106, a mail server that provides email services and/or functionality, a document storage application that provides remote document storage capability for users of an enterprise, or other applications or services that an enterprise may deploy to provide services for its users. Description of such applications or services is not necessary for a complete understanding of embodiments of the disclosure.

The data stored in the data store 216 may include user data 232, client device data 233, compliance rules 234, management records 235, notification configuration 236, and/or other information. The user data 232 can include data associated with a user account, such as user profile information. User profile information can include information about a user's role within an organization, an office address or location, home address or location, permissions, and/or privileges with respect to usage of an enterprise device. For example, certain users in an enterprise may be classified differently from other users. In this regard, users may be assigned to various user groups within an enterprise. For example, a user group may specify a worker role within a company (e.g., sales, marketing, human resources, etc.), a division within a company, a geographic location or corporate office of a company, a labor category within a company (e.g., executives, contractors, etc.), or any other attribute by which users may be grouped within an enterprise. Additionally, users may be assigned to more than one user group within an enterprise.

User data 232 can also include access settings such as authentication credentials, delegation settings (e.g., information about other users who may be provided access to the user data 232 of a particular user), mail and document retention rules and/or policies, and/or other geographic access restrictions or limitations (e.g., information about certain locations and/or networks from which user data 232 can be accessed). Some users may be granted permission to bypass one or more compliance rules 234, while other users may not. User data 232 can also include information about a user account within the computing environment 203, which is referred to herein as an enterprise user account. For example, the enterprise user account may be associated with an email address or other identifier that is assigned by the computing environment 203, which may be separate or different from a personal email address or other identifier that a user may use for personal purposes.

User data 232 can also include other account settings, such as biographical or demographic information about a user, password reset information, multi-factor authentication settings, and other data related to a user account as can be appreciated. User data 232 can also include other forms of data associated with users of an enterprise's computing resources that are not shown, such as a user's mailbox data, calendar data, contact data, and information about the various devices, such as device identifiers, that are assigned to the user and managed in some form by the management console 223. For example, mailbox data includes data associated with one or more mailboxes corresponding to a user account of a user. The mailbox data can include electronic mail messages, mail folders into which messages are organized, filtering rules that are applied to incoming and/or outgoing mail messages, attachments associated with mail messages, and/or other data associated with a mailbox of a user.

The client device data 233 may include information regarding the client devices 106 that are managed by the device management system 219. For example, client device data 233 may include a device identifier that uniquely identifies one or more client devices 106 that are associated the user's account in the enterprise. Such client device data 233 for a particular client device 106 may also include, for example, the identification of the particular applications that are installed in the client device 106, historical data regarding the operation of the client device 106, and/or other information.

In certain embodiments, a compliance rule 234 may specify a policy to which particular applications must adhere, which may be embodied within a compliance rule file. In some embodiments, an administrator may designate the policies that should be effectuated by a given compliance rule 234 via the management console 223. In some embodiments, a compliance rule 234 may include a pairing of at least one triggering condition and at least one remedial action, whose relationship is a "cause and effect" relationship such that upon the occurrence of a triggering condition a respective remedial action may be taken; that is, the triggering condition is the cause, and the remedial action is the effect of such cause.

In some embodiments, a compliance rule 234 may be enforced upon at least one feature of the client device 106 and/or at least one resource accessible to the client device 106 at startup and/or during run-time of the feature of the client device 106 or access to the resource. For instance, a compliance rule 234 associated with particular content (e.g., a portable document file (PDF) document) may be interpreted and enforced upon a request to access and/or otherwise use the content, and may be interpreted and enforced intermittently upon a time interval during access to and/or other usage of the content.

As described herein, a compliance rule 234 may include a triggering condition. In some embodiments, a triggering condition may include at least one of a request to perform at least one particular feature of the client device 106, a performance (e.g., partial, complete) of a particular feature of the client device 106, and/or a state of the client device 106. More specifically, the state of the client device 106 may include a plurality of characteristics describing the client device 106, such as at least one hardware feature enabled on the client device 106, at least one software feature enabled on the client device 106, at least one setting applied to the client device 106, at least one resource accessible to and/or stored by the client device 106, at least one geographic location of operation of the client device 106, and/or at least one time of operation of the client device 106. Additionally, the state of the client devices 106 may include a finite state that describes particular client devices 106 at a particular moment in time, or a comprehensive state that describes particular client devices 106 over a particular period of time. Consequently, a triggering condition may be defined as any undesirable state for the client device 106 to be in, which may include multiple criteria that may be evaluated over any configurable period of time.

Also as described herein, a compliance rule 234 may include a remedial action that may be paired with a triggering action. In certain embodiments, the remedial action may include at least one action that may be taken with respect to the client devices 106, which may be designated by an administrator of the client devices 106 (i.e., as a remedy to the triggering condition). In some embodiments, the remedial action may include a transmission of information (e.g., at least one notification) regarding the triggering condition being present on the client device 106.

For instance, the notification may be transmitted to a user of the client device 106 (e.g., as a warning) that may specify that a particular triggering condition is currently present on the client device 106 and that further remedial actions may be taken with respect to the client device 106 if the triggering condition remains present on the client devices 106 after a particular threshold duration has expired (i.e., after a grace period for incompliance has expired). Additionally, the notification may be transmitted to an administrator of the client device 106 that specifies that a particular triggering condition is present on the client device 106. Furthermore, the notification may be transmitted to a device management system 219 that specifies that a particular triggering condition is present on the client device 106, which may be used by the device management system to update management records associated with the client device 106 to reflect the occurrence of the triggering condition on the client device 106.

In various embodiments, compliance rules 234 may include passive violation thresholds 240, passive violation actions 241, active violation thresholds 242, active violation actions 243, bypass configuration 244, and/or other data. The passive violation thresholds 240 may indicate a triggering action or condition at which a passive violation is detected. Where the compliance rule 234 involves a geofence not to be breached, the passive violation threshold 240 may correspond to an internal geofence or at least one threshold distance from an outer geofence. Where the compliance rule 234 involves a geofence around an area not to be entered, the passive violation threshold 240 may correspond to an external geofence or at least one threshold distance from an inner geofence. Where the compliance rule 234 involves a geofence, the passive violation threshold 240 may also correspond to a grace period of time, if, for example, the client device 106 is turned on initially outside of a geofence not to be breached.

Where the compliance rule 234 involves a predefined period of time for use, the passive violation threshold 240 may involve a time period before the predefined period of time ends. The passive violation threshold 240 in this context may also correspond to a grace period of time, if, for example, the client device 106 is turned on initially outside of the predefined period of time for use.

The passive violation actions 241 correspond to remedial actions that may be performed in response to detecting a passive violation. For example, the passive violation actions

241 may include a dialog notification, a text message notification, an email notification, an alarm notification upon the client device 106 (e.g., sound and/or vibration), and/or other notifications. Other passive violation actions 241 may include temporarily disabling an application, temporarily disabling access to certain data, requiring re-authentication of a user of the client device 106, and so on.

The active violation thresholds 242 may define conditions upon which an active or intentional violation of the compliance rule 234 is detected. For example, a user may explicitly indicate that a violation is intended (e.g., through a user interface 103 (FIGS. 1A & 1B)). Alternatively, the active violation thresholds 242 may correspond to geofences, time limits, and so on, that are interpreted as corresponding to active violations. The active violation actions 243 comprise remedial actions that are taken in response to active violations being detected. The active violation actions 243 may be of a more impactful nature than the passive violation actions 241 to include, for example, deletions or wipes of managed applications and data, deletions or wipes of an entire client device 106, permanently disabling access to managed applications, and/or other actions.

Although the discussion above may be related to a preliminary threshold (passive violation threshold 240) and a final threshold (active violation threshold 242), it is understood that there may be multiple passive violation thresholds 240 and/or multiple active violation thresholds 242 for a given compliance rule 234, potentially with graduated passive violation actions 241 and/or active violation actions 243 with increasing severity. For example, as a user approaches a geofence, the passive violation thresholds 240 may specify passive violation actions 241 that are of an increasing intensity and/or frequency. Where the passive violation actions 241 are alarm notifications generated by a speaker, the alarm notifications may become increasingly louder and/or longer in duration as the user approaches the geofence.

The bypass configuration 244 may specify various circumstances upon which an active violation action 243 (and/or a passive violation action 241) may be bypassed. For example, the bypass configuration 244 may specify that bypassing is limited only to certain users or groups of users, or that bypassing is limited for certain types of violations of compliance rules 234. In some cases, a particular compliance rule 234 may not be bypassed. Further, assuming that a bypass is permitted, the bypass configuration 244 may specify consequential actions to accompany the bypass. For example, an administrator may be notified if a user requests a bypass.

The management records 235 may include data detailing various characteristics about the client device 106, a history of interactions with the client device 106, and/or other information. For example, the management records 235 may include event logs 245. The event logs 245 may record information about various actions that were taken, which may include passive violation actions 241 and active violation actions 243. The event logs 245 may record information such as time of violation, triggering condition, identification of a user, identification of the compliance rule 234 that was violated, identification of a client device 106, identification of an application that originated the triggering condition, and other information. The notification configuration 236 may configure how notifications are sent to administrative users. For example, an administrative user may configure notifications to be sent in instances where a user bypasses a compliance rule 234, where certain active violation actions 243 are performed, and so on. The notification configuration 236 may also control the form of notification (e.g., email, text message, phone call, notification in the management console 223, etc.) and to whom the notification is sent.

The client device 106 is representative of multiple client devices that may be coupled to the network 213. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors or other types of display devices.

The client device 106 may be configured to execute one or more managed applications 250, an agent application 253, and/or other components. The client device 106 may also store managed data 256 and/or other data. A managed application 250 may comprise, for example, one or more programs that perform various operations when executed in the client device 106. Such an operation may comprise, for example, storing data, reading data, controlling a component for the client device 106, and/or other functionality. A managed application 250 may perform some operations by initiating functions that are performed by an operating system in the client device 106. A managed application 250 may initiate operating system functions by, for example, performing API calls. A managed application 250 may be obtained from an application distribution environment and/or the device management system 219. In addition to managed applications 250, the client device 106 may execute one or more unmanaged applications.

The agent application 253 may function as part of a management system for the client device 106. The agent application 253 may be executed on the client device 106 to oversee, monitor, and/or manage at least a portion of the resources for the client device 106. The agent application 253 may be executed by the client device 106 automatically upon startup of the client device 106. Additionally, the agent application 253 may run as a background process in the client device 106. In other words, the agent application 253 may execute and/or run without user intervention. Additionally, the agent application 253 may communicate with the device management system 219 in order to facilitate the device management system 219 managing the client device 106. In particular, the agent application 253 may operate in conjunction with the managed applications 250 to effectuate directives from the device management systems 219. For example, the agent application 253 may call management API functions of the managed applications 250 to alter functionality, disable or enable features, and/or otherwise ensure compliance with the compliance rules 234.

Next, an additional description of the operation of the various components of the networked environment 200 is provided. To begin, compliance rules 234 are established for the device management system 219 in the computing environment 203. An administrator may control the operation of the device management system 219 via the management console 223. User account information is established in the user data 232. Client devices 106 are registered to the device management system 219 in the client device data 233, and an agent application 253 may be pushed to the client devices 106.

Managed applications 250 are transferred to and installed upon the client devices 106. Managed data 256 may also be transferred to the client device 106, or the managed data 256 may be generated by the managed applications 250. In some cases, the managed data 256 may be made available by the computing environment 203 and obtained on demand by the client device 106.

Users then proceed to use the client devices 106 to perform activities relating to the organization. In some cases, the users may use the client devices 106 to perform personal activities as well. During the course of use for the client device 106, the usage may fall under the purview of one or more compliance rule 234. The usage may pertain to managed applications 250, managed data 256, and potentially, unmanaged applications and unmanaged data. For a given compliance rule 234, one or more passive violation thresholds 240 may be configured, and the user's usage may meet or exceed a passive violation threshold 240. Such usage may pertain to location of the client device 106 relative to a geofence, access to managed applications 250 or other resources upon the client device 106 during a predefined period of time, cellular roaming, and/or other types of usage of the client device 106.

A passive violation action 241 may be implemented in response to the usage meeting a passive violation threshold 240. The passive violation action 241 may take the form of a notification, such as a dialog 112 (FIGS. 1A & 1B) in a user interface 103 (FIGS. 1A & 1B), a vibration, a sound, and/or other actions. The notification may be of a greater intensity or frequency depending on the extent of the violation. The notification may reference a passive violation remedial action. The user may confirm that the violation was intentional or unintentional. In some cases, the user may choose to bypass the compliance rule 234, upon which a notification, as configured by the notification configuration 236, may be sent to an administrator.

After the passive violation action 241 is implemented, the violation of the compliance rule 234 may continue. If the violation continues, one or more active violation thresholds 242 may be met. In this case, it may be determined that the violation is active rather than passive. If so, then one or more active violation actions 243 may be implemented. The active violation actions 243 may be more impactful or severe in nature than the passive violation actions 241. For example, the active violation actions 243 may dictate that a wipe of managed data 256 be performed, that use of managed applications 250 be disabled, that use of certain device features of the client device 106 be disabled (e.g., camera, sound recording, etc.), that all data upon the client device 106 be wiped, and/or other actions. A notification may be generated referencing an active violation remedial action.

The passive violation actions 241 and/or the active violation actions 243 may be implemented by the agent application 253 executed in the client device 106. For example, the agent application 253 may perform various operating system API calls or otherwise hook into the managed applications 250. Further, the agent application 253 may facilitate detection of compliance with the compliance rules 234. The operation of the agent application 253 may be controlled by the device management system 219, and the agent application 253 may report back information to the device management system 219 to be recorded in the event logs 245. Based upon such information, notifications to administrators may be generated by the device management system 219.

Figure 3:
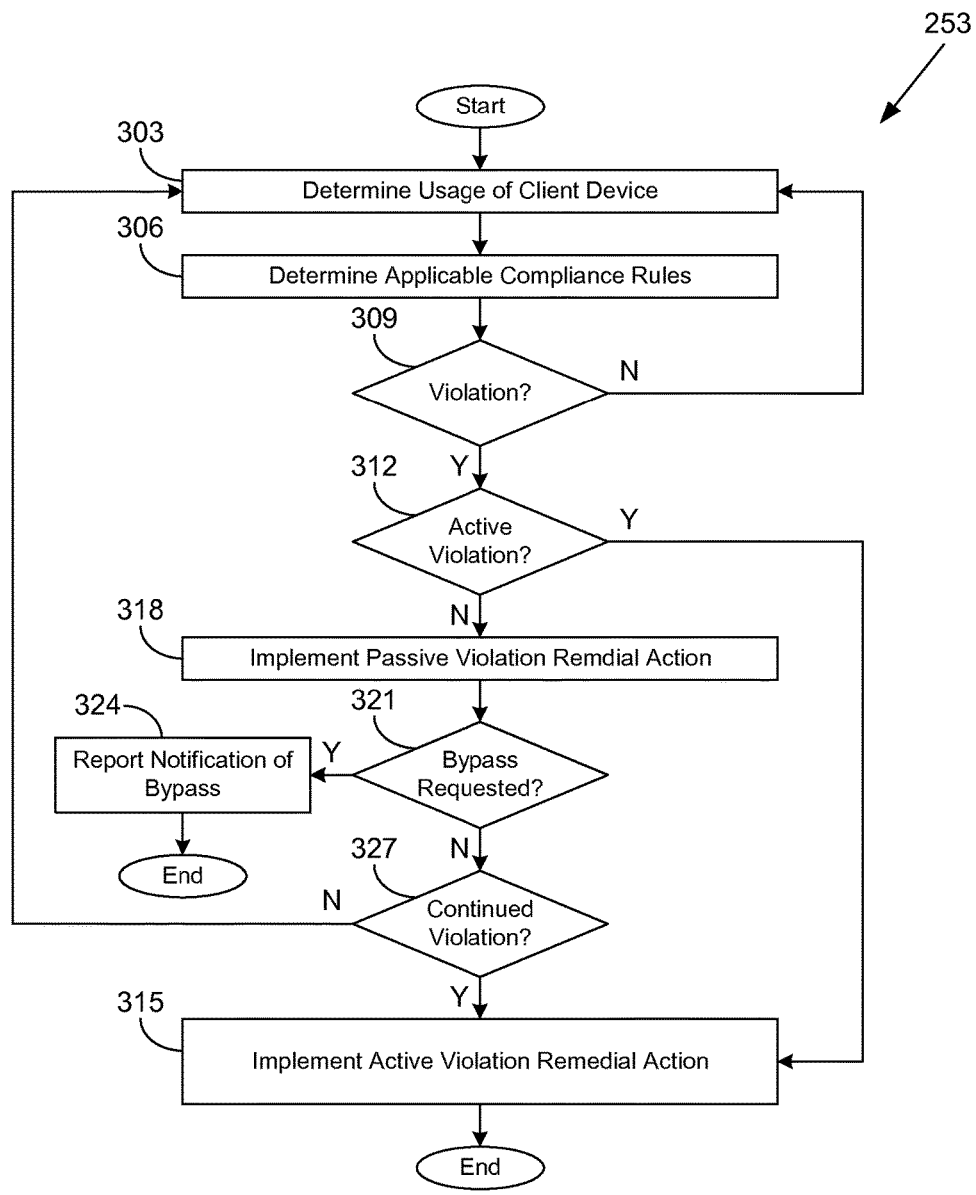
FIG. 3 is a flowchart illustrating one example of functionality implemented as portions of an agent application executed in a client device in the networked environment of FIG. 2 according to various embodiments of the present disclosure.

Referring next to FIG. 3, shown is a flowchart that provides one example of the operation of a portion of the agent application 253 according to various embodiments. It is understood that the flowchart of FIG. 3 provides merely an example of the many different types of functional arrangements that may be employed to implement the operation of the portion of the agent application 253 as described herein. As an alternative, the flowchart of FIG. 3 may be viewed as depicting an example of elements of a method implemented in the client device 106 (FIG. 2) or the computing environment 203 (FIG. 2) according to one or more embodiments. In some cases, portions of the following functionality may be implemented by the managed application 250 (FIG. 2) or the device management system 219 (FIG. 2).

Beginning with box 303, the agent application 253 determines a usage of the client device 106. The usage may be current usage of the client device 106, previous usage of the client device 106, and so on. The usage may include the location of the client device 106 (e.g., determined with respect to global positioning system (GPS) location, WI-FI access points, cellular towers, etc.), device features of the client device 106 that are being accessed, the managed applications 250 (FIG. 2) and/or other applications executed in the client device 106, managed data 256 (FIG. 2) being accessed, whether the client device 106 is using cellular roaming, the current user of the client device 106, an authentication status of the client device 106, a current time of use, a time last checked in with the device management system 219, and so on. In box 306, the agent application 253 determines one or more compliance rules 234 (FIG. 2) applicable to the usage of the client device 106.

In box 309, based at least upon the usage and the applicable compliance rules 234, the agent application 253 determines whether a policy violation has occurred or is in the process of occurring. For example, the agent application 253 may detect a policy violation if a managed resource of the client device 106 (e.g., a managed application 250 or managed data 256) is being accessed outside of a predefined period of time. Alternatively, the agent application 253 may detect a policy violation based on the proximity of the client device 106 to a geofence. The agent application 253 may also detect a policy violation if a prohibited component of the client device 106 is used within a geofence. Other policy violation extents may include an amount of time in a non-compliant state, a number of user notifications transmitted to the user during a current period of non-compliance or during a history of use of the client device 106, a number of blacklisted or unauthorized applications upon the client device 106, an amount of time the client device 106 was used while in an unauthorized geofence or time window, a number of minutes remaining in a calling plan, an amount of data remaining in a data plan, a duration of use during a roaming state, and so on. If no policy violation has occurred or is occurring, the agent application 253 returns to box 303 and updates the current usage of the client device 106. If a policy violation is occurring, the agent application 253 moves from box 309 to box 312.

In box 312, the agent application 253 determines whether the violation corresponds to an active policy violation. For example, the violation may be determined to be either an intentional violation or an unintentional violation that is sufficiently severe in nature to warrant a treatment similar to that of an intentional violation. In other words, the current usage may meet one or more active violation thresholds 242 (FIG. 2). If so, the agent application 253 proceeds to box 315 and implements a remedial action in response to the active policy violation. The remedial action may be specified in one or more active violation actions 243 (FIG. 2). Thereafter, the operation of the portion of the agent application 253 ends.

Otherwise, if it is determined in box 312 that the policy violation may be passive, the agent application 253 continues from box 312 to box 318. In other words, the current usage may have met one or more passive violation thresholds 240 (FIG. 2) but not the active violation thresholds 242. In box 318, the agent application 253 implements a passive violation remedial action pursuant to the passive violation actions 241 (FIG. 2). The passive violation remedial action may be a user notification of the policy violation. The user notification may comprise an audio notification, a vibration notification, or another form of alarm notification. An alarm notification may vary in intensity and/or duration based at least upon an extent of the policy violation (i.e., which of several passive violation thresholds 240 is met). In one example, a dialog 112*a* (FIG. 1) in a user interface 103 (FIG. 1) with notification text may be rendered by the client device 106 to visually inform the user of the violation. In one instance, the passive violation remedial action may comprise a notification requesting that the user confirm that the violation is unintentional. In another instance, the passive violation remedial action may provide a bypass mechanism.

In box 321, the agent application 253 determines whether a bypass of the compliance rule 234 has been requested. If a bypass has been requested, the agent application 253 moves from box 321 to box 324 and reports a notification of the bypass to an administrative system. In some cases, the agent application 253 may evaluate whether bypass is permissible for the current usage before allowing the bypass. Thereafter, the operation of the portion of the agent application 253 ends.

Alternatively, in some cases, a user may provide confirmation that the policy violation is intentional rather than requesting a bypass. If so, the agent application 253 may send an administrative notification of the intentional policy violation. The agent application 253 may also perform other remedial actions.

If a bypass has not been requested, or if a requested bypass is not permitted, the agent application 253 continues from box 321 to box 327. In box 327, the agent application 253 determines whether a continued policy violation has occurred. For example, a continued policy violation may be determined to occur if the extent of the policy violation has increased (e.g., client device 106 breaches a geofence or continues for a distance after having the breached the geofence), or if the policy violation has not stopped. If a continued policy violation has occurred, the policy violation may be assumed to be an active violation. In box 315, the agent application 253 implements a remedial action in response to the policy violation. The remedial action may be specified in one or more active violation actions 243. For example, a removal of a managed resource from the client device 106 may be initiated, access by the client device to a managed application 250 or managed data 256 may be restricted, and so on. Thereafter, the operation of the portion of the agent application 253 ends. If a continued policy violation has not occurred, the agent application 253 may return to box 303 and update the current usage of the client device 106. In this regard, an event log 245 (FIG. 2) in the management records 235 (FIG. 2) may be updated or created. To facilitate this, the agent application 253 may communicate with the device management system 219 to provide data for the device management system 219 to update a management record 235, or the agent application 253 may communicate with the device management system 219 to provide an updated management record 235.

Figure 4:
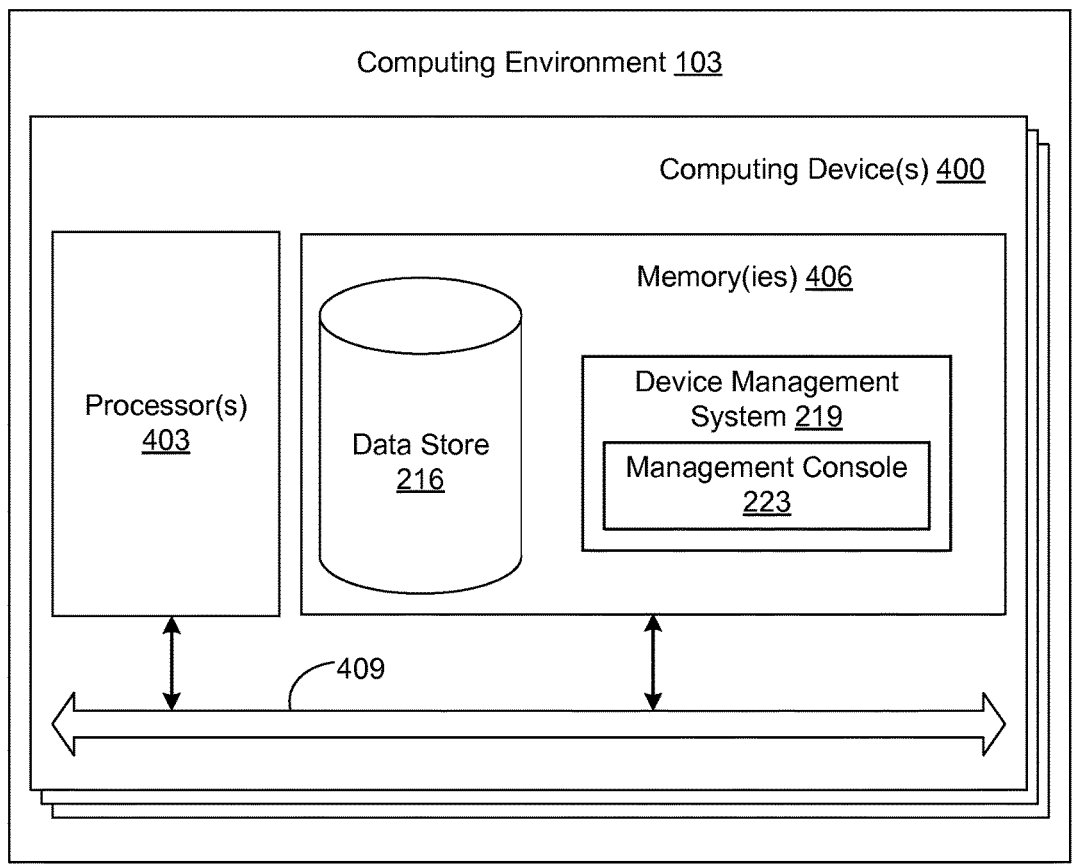
FIG. 4 is a schematic block diagram that provides one example illustration of a computing environment employed in the networked environment of FIG. 2 according to various embodiments of the present disclosure.
Figure 5:
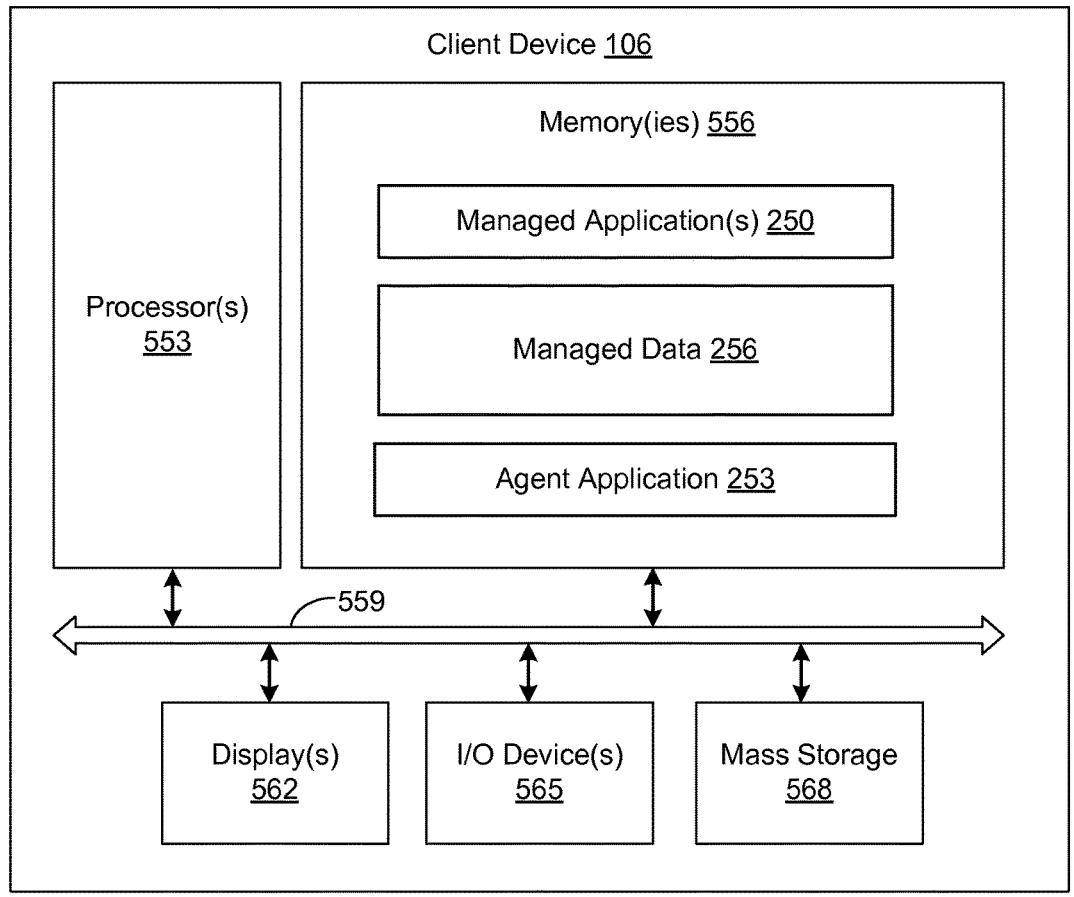
FIG. 5 is a schematic block diagram that provides one example illustration of a client device employed in the networked environment of FIG. 2 according to various embodiments of the present disclosure.

With reference to FIGS. 4 and 5, shown are schematic block diagrams of the computing environment 203 and client device 106 according to an embodiment of the present disclosure. The computing environment 203 includes one or more computing devices 400. Each computing device 400 and/or client device 106 includes at least one processor circuit, for example, having a processor 403, 553 and a memory 406, 556, both of which are coupled to a local interface 409, 559, respectively. As such, each computing device 400 may comprise, for example, at least one server computer or like device. A client device 106 may comprise a mobile device, smartphone, computing device, or like device. The local interface 409, 559 may comprise, for example, a data bus with an accompanying address/control bus or other bus structure as can be appreciated.

Stored in the memory 406, 556 are both data and several components that are executable by the processor 403, 553. In particular, stored in the memory 406 and executable by the processor 403 are a device management system 219, a management console 223, and potentially other applications. Also stored in the memory 406 may be a data store 216 and other data. In addition, an operating system may be stored in the memory 406 and executable by the processor 403. Stored in the memory 556 and executable by the processor 553 are managed applications 250, an agent application 253, and potentially other applications. Managed data 256 and other data may also be stored in the memory 556.

It is understood that there may be other applications that are stored in the memory 406, 556 and are executable by the processor 403, 553 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406, 556 and are executable by the processor 403, 553. In this respect, the term "executable" means a program file that is in a form that can ultimately be run by the processor 403, 553. Examples of executable programs may be, for example, a compiled program that can be translated into machine code in a format that can be loaded into a random access portion of the memory 406, 556 and run by the processor 403, 553, source code that may be expressed in proper format such as object code that is capable of being loaded into a random access portion of the memory 406, 556 and executed by the processor 403, 553, or source code that may be interpreted by another executable program to generate instructions in a random access portion of the memory 406, 556 to be executed by the processor 403, 553, etc. An executable program may be stored in any portion or component of the memory 406, 556 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406, 556 is defined herein as including both volatile and nonvolatile memory and data storage components. Volatile components are those that do not retain data values upon loss of power. Nonvolatile components are those that retain data upon a loss of power. Thus, the memory 406, 556 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403, 553 may represent multiple processors 403, 553 and/or multiple processor cores and the memory 406, 556 may represent multiple memories 406, 556 that operate in parallel processing circuits, respectively. In such a case, the local interface 409, 409 may be an appropriate network that facilitates communication between any two of the multiple processors 403, 553, between any processor 403, 553 and any of the memories 406, 556, or between any two of the memories 406, 556, etc. The local interface 409, 409 may comprise additional systems designed to coordinate this communication, including, for example, performing load balancing. The processor 403, 553 may be of electrical or of some other available construction.

The client device 106 may include a display 562 that comprises, for example, one or more devices such as liquid crystal display (LCD) displays, gas plasma-based flat panel displays, organic light emitting diode (OLED) displays, LCD projectors, or other types of display devices, etc. The client device 106 may also include one or more input/output devices 565 that may include, for example, a capacitive touchscreen or other type of touch input device, fingerprint reader, keyboard, etc. Additionally, the client device 106 may also include some form of mass storage 568, which can comprise a hard drive, flash memory, or other storage devices.

Although the device management system 219, the management console 223, the managed applications 250, the agent application 253, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows an example of the functionality and operation of an implementation of portions of the agent application 253. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the device management system 219, the management console 223, the managed applications 250, and the agent application 253, that comprises software or code can be embodied in any non-transitory computer-readable medium for use by or in connection with an instruction execution system such as, for example, a processor 403, 553 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the device management system 219, the management console 223, the managed applications 250, the agent application 253, etc., may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400 and/or client device 106, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program being configured to monitor and restrict usage of a mobile device as part of an enterprise mobility management system, comprising:
   code that monitors usage of one or more enterprise applications on the mobile device according to compliance rules established remotely at the enterprise mobility management system, the compliance rules being defined as one or more policies and sent to the mobile device from the enterprise mobility management system;
   code that determines that a policy violation with respect to use of the mobile device under management by the enterprise mobility management system has occurred;
   code that determines whether the policy violation is a passive violation;
   code that causes a user notification of the policy violation to be generated by the mobile device and displayed on a screen of the mobile device that violated the policy in response to determining that the policy violation is the passive violation;
   code that, after causing the user notification to be generated, determines that the policy violation has increased in severity to an active violation;
   code that determines whether an active violation remedial action associated with the active violation can be bypassed;
   code that initiates the active violation remedial action in response to determining that the policy violation is the active violation and cannot be bypassed, the active violation remedial action being defined by the enterprise mobility management system; and
   code that bypasses the active violation remedial action based on a request from the user when the active violation can be bypassed.

2. The non-transitory computer-readable medium of claim 1, wherein the action comprises removing or disabling access to a managed resource on the mobile device.

3. A method for monitoring and restricting usage of a mobile device as part of an enterprise mobility management system, comprising:
   monitoring usage of one or more enterprise applications on the mobile device according to compliance rules established remotely at the enterprise mobility management system, the compliance rules being defined as one or more policies and sent to the mobile device from the enterprise mobility management system;
   detecting, using the mobile device under management, that a policy violation with respect to use of the mobile device under management by the enterprise mobility management system has occurred;
   determining, by the mobile device, that the policy violation is a passive violation based at least in part on an extent of the policy violation;
   causing a user notification to be generated by the mobile device and displayed on a screen of the mobile device that violated the policy in response to determining that the policy violation is the passive violation;
   after causing the user notification to be generated, determining that the policy violation has increased in severity to an active violation;
   determining whether an active violation remedial action associated with the active violation can be bypassed;
   initiating the active violation remedial action in response to determining that the policy violation is the active violation and cannot be bypassed, the active violation remedial action being defined by the enterprise mobility management system; and
   bypassing the active violation remedial action based on a request from the user when the active violation can be bypassed.

4. The method of claim 3, wherein the passive violation remedial action comprises at least one of: an audio user notification or a vibration user notification.

5. The method of claim 3, wherein the passive violation remedial action comprises an alarm notification by the mobile device, wherein at least one of: a frequency of the alarm notification or an intensity of the alarm notification depends at least in part on the extent of the policy violation.

6. The method of claim 3, wherein detecting that the policy violation has occurred further comprises detecting that a managed resource of the mobile device is being accessed outside of a predefined period of time.

7. The method of claim 3, further comprising:
   determining, by the mobile device, that the policy violation is an active violation after the passive violation remedial action has been generated; and
   initiating, by the mobile device, an active violation remedial action.

8. The method of claim 7, wherein initiating the active violation remedial action further comprises initiating a removal of a managed resource from the mobile device.

9. The method of claim 7, wherein initiating the active violation remedial action further comprises restricting access by the mobile device to at least one of: a managed application or managed data.

10. The method of claim 3, further comprising:
    receiving, by the mobile device, a user confirmation that the policy violation is intentional; and
    sending, by the mobile device, an administrative notification of the intentional policy violation.

11. The method of claim 3, wherein detecting that the policy violation has occurred further comprises:
    determining, by the mobile device, a current location of the mobile device; and
    determining, by the mobile device, that the current location is within a first threshold of a geofence.

12. The method of claim 11, further comprising:
    determining, by the mobile device, an updated location of the mobile device after the user notification has been generated;

determining, by the mobile device, that the current location is within a second threshold of the geofence, the second threshold being nearer to the geofence than the first threshold; and determining, by the mobile device, that the policy violation is an active policy violation in response to determining that the updated location is within the second threshold of the geofence; and initiating, by the mobile device, an active violation remedial action.

13. A system for monitoring and restricting usage of a mobile device as part of an enterprise mobility management system, comprising:

a mobile device; and an enterprise management system executed in part in the mobile device, the enterprise mobility management system comprising:

logic that monitors usage of one or more enterprise applications on the mobile device according to compliance rules established at a remote server from the mobile device, the compliance rules being defined as one or more policies and sent to the mobile device from the remote server;

logic that detects that a policy violation with respect to use of the mobile device has occurred;

logic that determines an extent of the policy violation;

logic that causes a user notification to be presented on the mobile device, wherein at least one characteristic associated with the user notification is based at least in part on the policy violation being a passive violation;

logic that, after causing the user notification to be generated, determines that the policy violation has increased in severity to an active violation;

logic that determines whether an active violation remedial action associated with the active violation can be bypassed;

logic that initiates the active violation remedial action in response to determining that the policy violation is the active violation and cannot be bypassed, the active violation remedial action being defined by the enterprise mobility management system; and logic that bypasses the active violation remedial action based on a request from the user when the active violation can be bypassed.

14. The system of claim 13, wherein the at least one characteristic comprises at least one of: a frequency of the user notification or an intensity of the user notification.

15. The system of claim 13, wherein the at least one characteristic comprises whether the user notification references a passive violation remedial action or an active violation remedial action.

16. The system of claim 13, wherein the extent of the policy violation corresponds to a proximity of the mobile device to a geofence boundary.

17. The system of claim 13, wherein the policy violation corresponds to use of a prohibited component of the mobile device within a geofence boundary.

18. The system of claim 13, wherein the policy violation corresponds to use of a managed application of the mobile device outside of a predefined period of time.

19. The system of claim 13, wherein the enterprise mobility management system further comprises:

logic that, in response to causing the user notification to be presented, determines that the extent of the policy violation has increased; and logic that initiates an action in response to determining that the extent of the policy violation has increased.

20. The system of claim 19, wherein the action comprises removal of a managed resource from the mobile device.

21. The system of claim 19, wherein the action comprises disabling access to a managed resource by the mobile device.

22. The system of claim 19, wherein the action comprises sending a notification of the policy violation to an administrator.

* * * * *